United States Patent
Kato et al.

(10) Patent No.: US 9,381,686 B2
(45) Date of Patent: Jul. 5, 2016

(54) RESIN INJECTION MOLDING DIE AND METHOD FOR PRODUCING RESIN MOLDED PRODUCT

(71) Applicant: TOYODA GOSEI CO., LTD., Kiyosu-shi, Aichi-ken (JP)

(72) Inventors: Mamoru Kato, Kiyosu (JP); Takahito Ogiso, Kiyosu (JP); Kazuo Suzuki, Kiyosu (JP); Tatsuo Yamada, Kiyosu (JP); Hiroshi Watarai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/594,303

(22) Filed: Jan. 12, 2015

(65) Prior Publication Data
US 2015/0217494 A1 Aug. 6, 2015

(30) Foreign Application Priority Data
Jan. 31, 2014 (JP) .................. 2014-016482

(51) Int. Cl.
| | |
|---|---|
| *B29C 45/26* | (2006.01) |
| *B29C 45/14* | (2006.01) |
| *B29C 45/37* | (2006.01) |
| B29C 45/00 | (2006.01) |
| B29K 9/00 | (2006.01) |
| B29L 9/00 | (2006.01) |

(52) U.S. Cl.
CPC ............. *B29C 45/14* (2013.01); *B29C 45/0046* (2013.01); *B29C 45/0053* (2013.01); *B29C 45/37* (2013.01); *B29C 45/0025* (2013.01); *B29C 45/26* (2013.01); *B29C 45/263* (2013.01); *B29C 2045/0079* (2013.01); *B29K 2009/00* (2013.01); *B29L 2009/003* (2013.01)

(58) Field of Classification Search
CPC ............................ B29C 45/26; B29C 45/0025
USPC ............... 425/549, 564, 566, 542; 264/328.1, 264/328.12
See application file for complete search history.

(56) References Cited

U.S. PATENT DOCUMENTS

| | | |
|---|---|---|
| 2008/0053834 A1 | 3/2008 | Shimizu |
| 2010/0183762 A1* | 7/2010 | Babin ..................... B29C 45/27 425/549 |
| 2011/0064887 A1 | 3/2011 | Osamura et al. |

FOREIGN PATENT DOCUMENTS

| | | |
|---|---|---|
| JP | 2007-327131 A | 12/2007 |
| JP | 2011-63855 A | 3/2011 |

OTHER PUBLICATIONS

Lee W. Fritch. "Grooved Mold Improves Plate Adhesion". 2006. GE Plastics. Washington, West Virginia.

* cited by examiner

*Primary Examiner* — Tim Heitbrink
(74) *Attorney, Agent, or Firm* — Posz Law Group, PLC

(57) ABSTRACT

A molding die is devised to suppress the formation of a fragile layer, thereby ensuring stable production of a resin molded body having remarkably improved adhesion of a plating film. A plurality of stepped parts are formed so as to be spaced apart from each other on a second die surface which molds a back surface on the side opposite to a design surface to which metal plating is to be applied, along the main flowing direction of a molten resin and in a direction crossing the main flowing direction. Since the flow of the molten resin changes due to the stepped parts and the influence thereof extends even to the vicinity of the design surface, the formation of a fragile layer is suppressed.

11 Claims, 8 Drawing Sheets

Main flowing direction of molten resin

Main flowing direction of molten resin

Main flowing direction of molten resin

Main flowing direction of molten resin

Main flowing direction of molten resin

Main flowing direction of molten resin

Main flowing direction of molten resin

Main flowing direction of molten resin

Main flowing direction of molten resin

Main flowing direction of molten resin

RESIN INJECTION MOLDING DIE AND METHOD FOR PRODUCING RESIN MOLDED PRODUCT

BACKGROUND OF THE INVENTION

1. Field of the Invention

The present invention relates to an injection molding die for producing a resin molded body having a design surface and a method for producing a resin molded product using the die. A metal plating layer is formed on the design surface of the resin molded body molded using the injection molding die of the present invention.

2. Description of Related Arts

Many members having a metal plating layer, such as an ornament, a grill, a wheel cap, a resistor and a bumper are used in automobiles. Such members are produced by preparing a resin base material, for example, by injection molding and applying plating of a metal such as chromium to its design surface. While metal plating is carried out by electroplating, the resin base material is an insulator in many cases, and thus is often difficult to undergo electroplating.

Therefore, electroless plating is applied to a resin base material to form an electrically conductive metal layer made of nickel or the like, and electroplating is then carried out. Alternatively, electroplating is carried out by a plating direct process with electroless plating treatment being omitted.

However, the adhesion of a plating film to a resin molded body becomes problematic in many cases, and thus various methods have been proposed in order to improve the adhesion. For example, JP 2011-063855 A describes a method including treating a resin base material with an ozone solution to form a surface-modified layer, giving energy such as plasma to remove a surface layer of the surface-modified layer, and thereafter applying electroless plating thereto.

JP 2007-327131 A describes a method including treating a surface of a resin base material with a pretreatment solution containing an anionic surfactant and an organic solvent, treating the base material with a noble metal ion-containing treatment liquid containing an anionic surfactant and noble metal ions, subjecting the plated material to heating treatment, treating the heat-treated material with an aqueous alkaline solution, and thereafter applying electroless plating treatment thereto.

According to these methods, the adhesion of a plating film is improved without using a harmful substance such as chromic acid.

RELATED ARTS DOCUMENTS

Patent Documents

Patent Document 1: JP 2011-063855 A
Patent Document 2: JP 2007-327131 A

SUMMARY OF THE INVENTION

However, even in resin molded bodies with a plating film produced by the techniques described in the above publications, swelling and peeling sometimes occurs, for example, in the case where heat history having a great temperature difference acts thereon. This is considered to have occurred due to a great difference in thermal expansion coefficient between the metal plating film and the resin base material. Further, the techniques described in the above publications involve the disadvantages of a large number of steps and low productivity as compared with those in etching treatment with chromic acid.

The present invention has been made in light of the above-described problems, and involves the problem to be solved of devising a molding die to suppress the formation of a fragile layer, thereby ensuring stable production of a resin molded body having remarkably improved adhesion of a plating film.

A resin injection molding die according to the present invention, which can solve the above-described problems, includes a first die surface which molds a design surface of a resin molded product to which metal plating is to be applied and a second die surface which molds a back surface on the side opposite to the design surface and faces the first die surface. The second die surface is provided with a plurality of stepped parts which are formed so as to extend one step higher or lower than a common die surface part, with a step surface, and then to continue to the common die surface part, along the main flowing direction of a molten resin which, during injection molding, flows in a cavity formed by the first and second die surfaces; and the step surfaces cross the main flowing direction of the molten resin, and the plurality of stepped parts are formed so as to be spaced apart from each other also in a direction crossing the main flowing direction of the molten resin.

Also, a method for producing a resin molded product according to the present invention includes injection molding a thermoplastic resin by means of the resin injection molding die according to the present invention to form a resin molded body and forming a metal plating layer on a design surface of the resin molded body.

When a plating film was formed on a resin molded body molded by means of a conventional resin injection molding die to investigate the peeling state thereof, it has been revealed that peeling occurs not from an interface between the plating film and the resin base material, but within the surface layer of the resin base material where the plating film was formed. In other words, it has been found that the film does not develop interfacial peeling, but peels due to cohesive failure of the resin base material.

Hence, a surface of the resin molded body where plating was to be applied was removed up to a predetermined depth by polishing, and a plating film was then formed thereon to conduct a test for measuring the adhesion strength. The results are shown in FIG. 1. It has been revealed that, as the polishing quantity becomes larger, i.e., the surface is removed more deeply, the adhesion strength significantly improves, as shown in FIG. 1. In other words, it has been found that, in the resin molded body molded by the injection molding method, the surface layer and the inside have different structures, and that a fragile layer is formed on the surface layer.

Therefore, it is inferred that the adhesion of the plating film would improve when the formation of the fragile layer on the surface is suppressed. As a result of repeated intensive studies, the present invention has been completed.

According to the resin injection molding die according to the present invention, it is considered that the flow of a molten resin during molding changes due to the stepped parts of the second die surface and that the influence thereof extends also to the surface layer of the design surface molded by the first die surface. Therefore, the formation of a fragile layer is suppressed, resulting in improved adhesion of the plating film formed on the design surface.

DETAILED DESCRIPTION OF PREFERRED EMBODIMENTS

Figure 1:
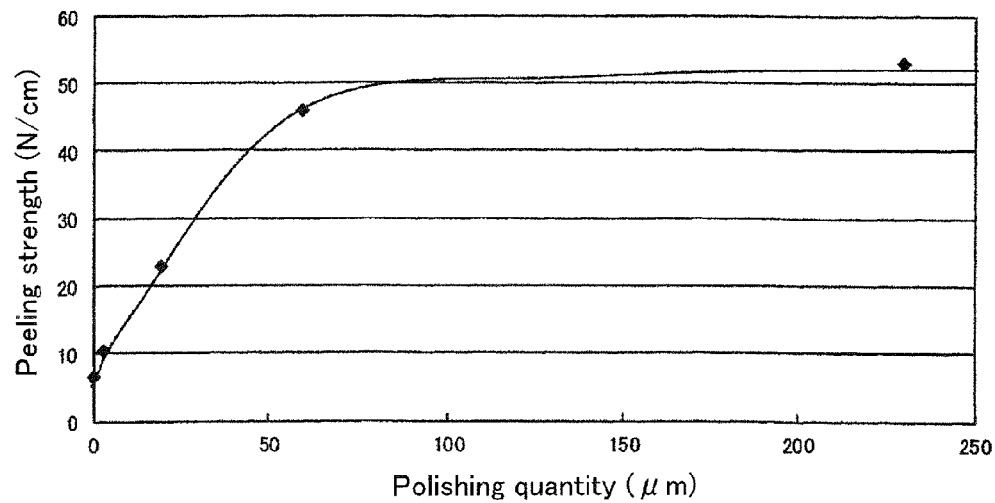
FIG. 1 is a graph showing the relation between the polishing quantity with respect to a design surface of a resin molded body and the peeling strength of a plating film.

The resin injection molding die according to the present invention includes a first die surface and a second die surface. The "first die surface" refers to a design surface of a resin molded body, i.e., a die surface which molds a surface to which metal plating is to be applied. The "second die surface" refers to a die surface which molds a back surface of the resin molded body on the side opposite to the design surface, and faces the first die surface. As regards the first and second die surfaces, one of them may be a fixed die surface, and the other can be a movable die surface. Alternatively, the second die surface can also be a die surface of a slide core.

For effective development of the action caused by a stepped part, the interval between the first and second die surfaces is important. It is considered that when the interval is too long, the action caused by the stepped part is not provided. An optimum range of the interval is also considered to vary depending, for example, on the flow rate, viscosity and material of a molten resin flowing in a cavity. For example, in the case of an ABS resin used in Examples, the above-described interval preferably ranges from 2 mm to 6 mm, optimally ranges from 2.5 mm to 4 mm when the flow rate of the molten resin ranges from 2 cm/sec. to 150 cm/sec.

The second die surface is provided with a plurality of stepped parts which are formed so as to extend one step higher or lower than a common die surface part, with a step surface, and then to continue to the common die surface part, along the main flowing direction of a molten resin which, during injection molding, flows in a cavity formed by the first and second die surfaces at the time of injection molding. Examples of the stepped parts include a concave groove, an annular groove, a tapered step part which gradually continues to a common die surface part from a step surface, and a protrusion. The step surface may be either a wall surface erected from the common die surface part of the second die surface or a concave wall surface engraved from the common die surface part into the second die surface. From easiness of die machining, the concave wall surface engraved into the second die surface is preferably used as the step surface.

The stepped parts are formed on the second die surface opposite to the first die surface which molds at least a range wherein metal plating is to be applied in the design surface of the resin molded body, but may also be formed on the second die surface facing a range in which no metal plating is to be applied.

The angle formed between the common die surface part and the step surface is desirably 90° or more. A sharp angle causes an undercut and makes demolding of the resin molded body difficult in some cases. The common die surface part and step surface may continue to each other via a chamfered curved surface, but desirably cross in an edge-like shape in the cross section cut in a plane parallel to the main flowing direction of the molten resin. Such a structure further improves the adhesion of the plating film in some cases.

The depth or height of the stepped parts preferably ranges from 0.1 mm to 0.3 mm. When the depth or height exceeds 0.3 mm, sink mark is sometimes generated on the design surface molded by the first die surface. When the depth or height is smaller than 0.1 mm, the effects by formation of the stepped parts are hard to develop, thereby reducing the adhesion of the plating film.

When the stepped parts are concave, their width (section width when the stepped parts are cut in a plane parallel to the flowing direction of the molten resin) preferably ranges from 0.2 mm to 1.0 mm. When this width exceeds 1.0 mm, sink mark is sometimes generated on the design surface molded by the first die surface, depending on the depth of the stepped parts. When the width is narrower than 0.2 mm, the molten resin is hard to enter the stepped parts, thereby making difficult the development of the effects by the formation of the stepped parts, leading to the reduction in adhesion of the plating film.

The plurality of stepped parts are formed alternately with the common die surface parts, along the main flowing direction of the molten resin flowing in the cavity. The pitches of the stepped parts in a direction along the main flowing direction of the molten resin, i.e., intervals between the step surfaces preferably range from 2 mm to 20 mm. When this pitch exceeds 20 mm, the range of the common die surface part would widen, leading to the reduction in adhesion of the plating film. Also, when this pitch is smaller than 2 mm, the adhesion of the plating film reduces. The pitch most preferably ranges from about 3 mm to about 10 mm.

The step surface crosses the main flowing direction of the molten resin in a linear or curved manner. The step surface preferably crosses the main flowing direction of the molten resin linearly as compared with in a curved manner. A plane crossing the main flowing direction of the molten resin at a right angle is most preferably used as the step surface.

The plurality of stepped parts are formed so as to be spaced apart from each other also in a direction crossing the main flowing direction of the molten resin. Specifically, the plurality of stepped parts and the plurality of common die surface parts are formed alternately in the direction vertical to the main flowing direction of the molten resin. Such a structure suppresses a variation in change of flow of the molten resin and stabilizes the adhesion of the plating film.

The length of the stepped parts in the cross section cut in a plane vertical to the main flowing direction of the molten resin is preferably defined as 2 mm or more. When this length is less than 2 mm, the improvement in adhesion of the plating film would not be expected. The intervals between the stepped parts in the cross section cut in a plane vertical to the main flowing direction of the molten resin are not especially limited, but are preferably defined as being equivalent to the length of the stepped parts in the direction vertical to the main flowing direction of the molten resin, and defined preferably as 2 mm or more, more preferably within the range of 3 mm to 20 mm.

The shape of the stepped parts can be various shapes as indicated in Examples. Since the main flowing direction of the molten resin generally varies depending on the sites in the cavity, the stepped parts are preferably formed in accordance with the flowing directions at the respective sites. For some of the patterns of the stepped parts, one pattern can correspond to a plurality of flowing directions.

A die surface extending in the demolding direction of the resin molded body or a die surface of a slide core can also be used as the second die surface having stepped parts. In these cases, it is assumed that the stepped parts become undercuts, thereby causing difficulty in demolding. Thus, the stepped parts of the second die surface in these cases are preferably tapered step parts which gradually continue to the common die surface parts to the side opposite to the demolding direction of the resin molded body or toward the demolding direction. Such a structure enables demolding of the resin molded body.

As the species of resins which can be molded using the resin injection molding die according to the present invention, not only resin species which can form a metal plating film, but also resin species which can be molded by the injection molding method may be used. For example, polyester, ABS (acrylonitrile-butadiene-styrene), PC/ABS polymer alloys, polystyrene, polycarbonate, acryl, liquid crystal polymers (LCP), polyolefin, cellulose-modified resins, polysulfone, polyphenylene sulfide, polyether sulfone, polyether ether ketone, polyimide, fluorine resins and the like can be used.

The resin molded body molded using the resin injection molding die according to the present invention has a design surface molded by the first die surface and a back surface molded by the second die surface, and a plurality of convex or concave parts obtained by transfer of the stepped parts are formed on the back surface. The volume of the convex or concave parts can be reduced to a predetermined range or less by defining the dimensions and pitches of the stepped parts within the above-described range, thereby preventing the generation of sink mark on the design surface and the reduction in strength of the resin molded body.

In the resin molded body molded using the resin injection molding die according to the present invention, a metal plating film can be formed on the design surface molded by the first die surface. Hereinafter, a method for forming a metal plating film will be explained.

The resin molded body is firstly subjected to cleaning treatment such as washing and defatting, and then generally to etching treatment. The etching treatment may be carried out using chromic acid, a solution mixture of chromic acid and sulfuric acid, a permanganic acid salt or the like, or can also employ an ozone solution or an ozone gas. For example, it is only necessary to use a solution mixture of chromic acid and sulfuric acid to immerse at least the design surface of the resin molded body in the moderately warmed solution. When a resin molded body formed from ABS is used, the butadiene rubber, which is a component, is eluted by the etching treatment due to the oxidation action of chromic acid so that an anchor part having a pore diameter of about 1 µm to 2 µm is formed on the surface of the resin, and butadiene undergoes oxidation decomposition so that a polar group such as a carbonyl group is imparted. Therefore, the adsorption of a catalyst in the subsequent step is made easy.

After the etching treatment, electroless plating treatment and electroplating treatment are carried out. Alternatively, no electroless plating treatment is carried out in some cases such as in the plating direct process. When the electroless plating treatment is carried out, catalyst adhesion treatment is carried out prior to the electroless plating. As metal fine particles (catalysts) having catalytic activity to electroless plating, gold, silver, ruthenium, rhodium, palladium, tin, iridium, osmium, platinum and the like can be used singly or as a mixture thereof. These catalysts are often used as a colloid solution.

After the catalyst adhesion treatment, an electrically conductive plating layer made of nickel, copper or the like is formed by the electroless plating treatment using a known method, and thereafter a metal plating film made of chromium or the like is formed by a known electroplating method.

Also, in the case of the plating direct process, as much palladium as possible is adsorbed onto the resin surface by treatment with an activator solution such as a tin/palladium/colloid solution enclosed by tin chloride. Thereafter, conductor forming treatment of, for example, removing inert colloid tin from a palladium film is carried out, and then a metal plating film made of chromium or the like is formed by a known electroplating method.

In the case of the plating direct process, the convex parts of the resin molded body generally obstruct plating growth. However, the convex or concave parts formed by the stepped parts are present on the back surface on the side opposite to the design surface in the present invention, and thus are less problematic. When the stepped parts of the second die surface are designed to have the dimensions as described above, plating growth can be carried out also in the convex parts in the plating direct process.

Hereinafter, embodiments of the present invention will be explained in detail by way of Examples.

EXAMPLES

Example 1

Figure 2:
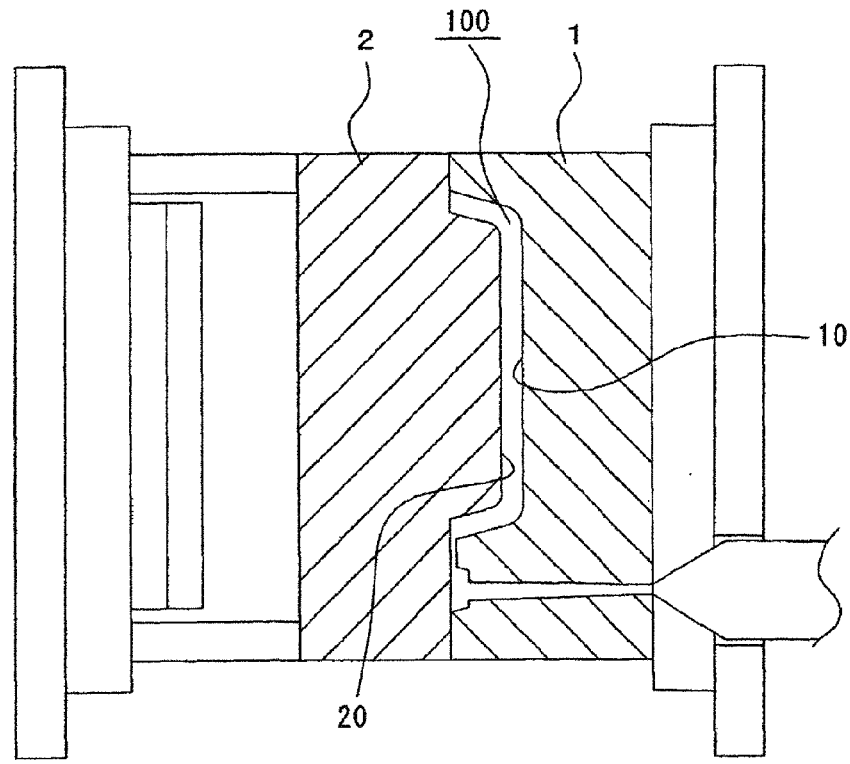
FIG. 2 is a schematic explanatory view showing an injection molding die according to Example 1 of the present invention partially in cross section.
Figure 3:
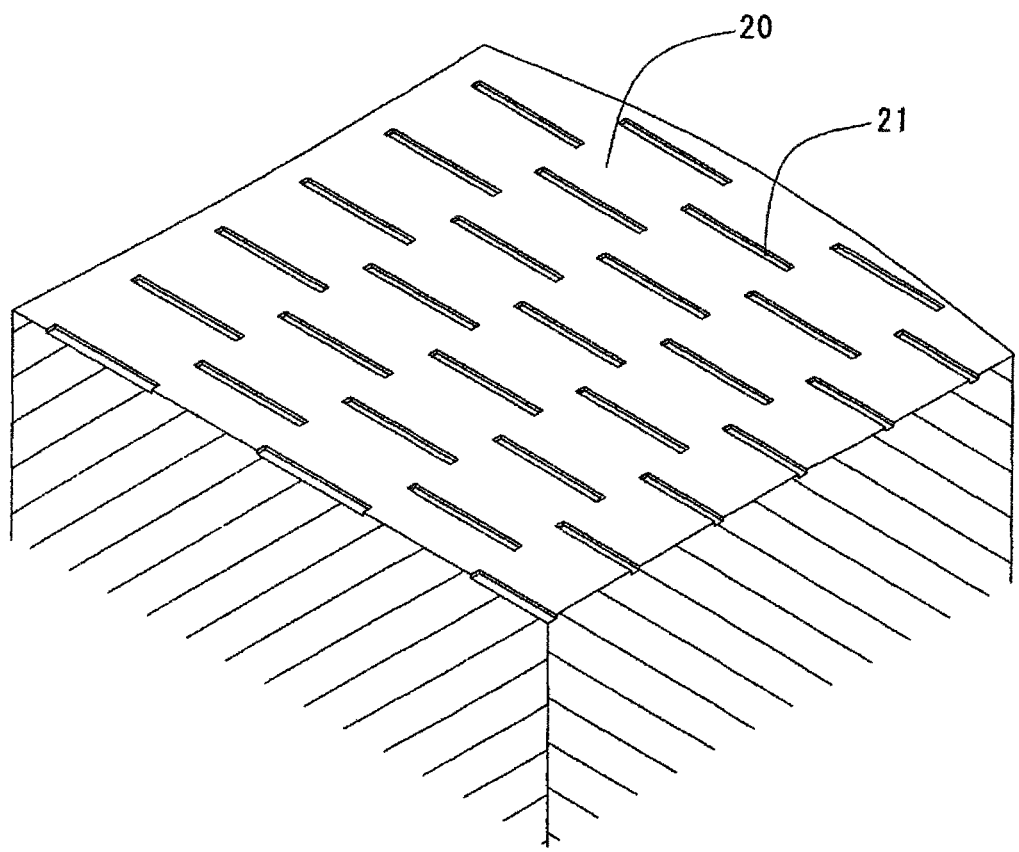
FIG. 3 is a perspective view showing an essential part of a second die surface of the injection molding die according to Example 1 of the present invention.

FIG. 2 shows a resin injection molding die of this Example. This die has a fixed die 1 and a movable die 2. The die surface of the fixed die 1 has a first die surface 10 which molds a design surface of a resin molded body, and the die surface of the movable die 2 has a second die surface 20 which molds a back surface opposite to the design surface. A plurality of stepped parts 21 spaced apart from each other are formed along the main flowing direction of a molten resin flowing in a cavity 100 formed by the first die surface 10 and the second die surface 20, as shown in FIG. 3. The plurality of stepped parts 21 are formed spaced apart from each other also in the direction orthogonal to the main flowing direction of the molten resin.

The groove-shaped stepped parts 21 are such that their longitudinal direction extends in a direction at a right angle to the main flowing direction of a molten resin. In the meantime, the interval (thickness of the cavity 100) between the first die surface 10 and the second die surface 20 is 3 mm.

Figure 4:
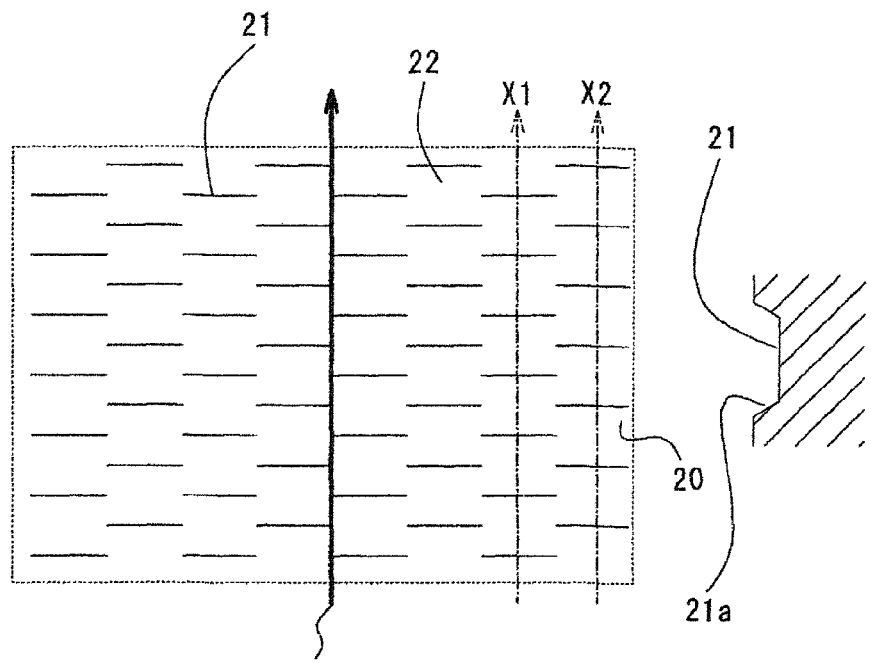
FIG. 4 is a schematic plan view showing the essential part of the second die surface of the injection molding die according to Example 1 of the present invention.

When schematically showing a plan view of the second die surface 20, steps in which the groove-shaped stepped parts 21 are arranged in a staggered manner are formed as shown in FIG. 4. The cross sectional shape when the stepped parts 21 are cut in a plane parallel to the main flowing direction of the molten resin is a trapezoidal shape as shown in FIG. 4, and a wall surface 21a on the rear side to the main flowing direction of the molten resin constitutes a step surface 21a. The dimensions of the groove-shaped stepped parts 21 are 5 mm for the longitudinal length, 1 mm for the opening width and 0.2 mm for the depth. The stepped parts 21 are aligned at intervals of 5 mm in a direction at a right angle to the main flowing direction of the molten resin. Also, the effective pitch between the step surfaces 21a (wall surfaces 21a) in the cross section parallel to the main flowing direction of the molten resin is 4 mm.

In the resin injection molding die of this Example, the molten resin flows at right angle to the longitudinal direction of the stepped parts 21 during injection molding. Specifically, at a certain moment, a flow path X1 running in the stepped parts 21 and a flow path X2 running in common die surface parts 22 which are present between the stepped parts 21 are present as flow paths for the molten resin. The molten resin flows through the flow paths X1 and X2 at the same time in the cross section cut in a plane vertical to the main flowing direction. In the flow path X1, the molten resin which has flown onto a stepped part 21 flows through the next common die surface part 22, whereas, in the flow path X2, the molten resin which has flown through the common die surface part 22 flows onto the next stepped part 21.

That is, the effective pitch between the step surfaces 21a in the cross section parallel to the main flowing direction of the molten resin is 4 mm, but different forces alternately act from the stepped parts 21 at a pitch of 2 mm on the molten resin flowing through the flow paths X1 and X2 at the same time. The flow of the molten resin changes due to the repetition of these movements, and the influence thereof extends to the vicinity of the design surface.

Example 2

Figure 5:
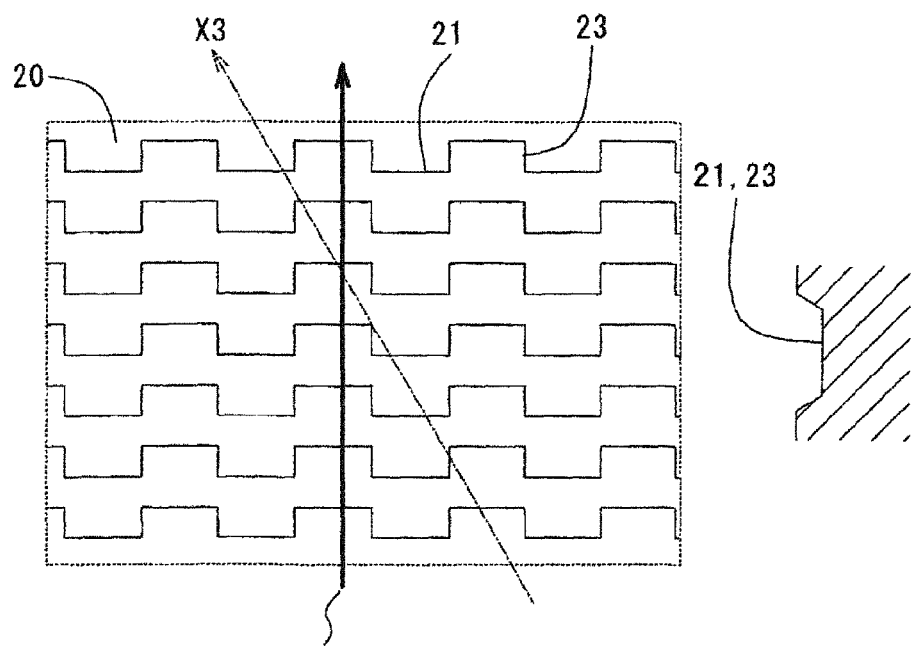
FIG. 5 is a schematic plan view showing an essential part of a second die surface of an injection molding die according to Example 2 of the present invention.

FIG. 5 is a schematic plan view showing a second die surface 20 of a resin injection molding die according to this Example. The die of this Example is similar to that of Example 1 except that the form of steps is different. Specifically, the shape of each of stepped parts 21 is a groove shape having a trapezoidal cross section which is identical with that in Example 1, and the stepped parts 21 aligned in a staggered manner as with Example 1 are connected to each other, at their ends, by a 2.5 mm-long vertical groove 23 extending in parallel to the main flowing direction of the molten resin. The opening width and depth of the vertical groove 23 are identical with those of the stepped parts 21.

According to the resin injection molding die of this Example, the vertical groove 23 also functions as a stepped part, and thus the flow of the molten resin changes even when the direction in which the molten resin flows is different from the main flowing direction (for example, X3 direction shown in FIG. 5), and the influence thereof extend to the vicinity of the design surface.

Example 3

Figure 6:
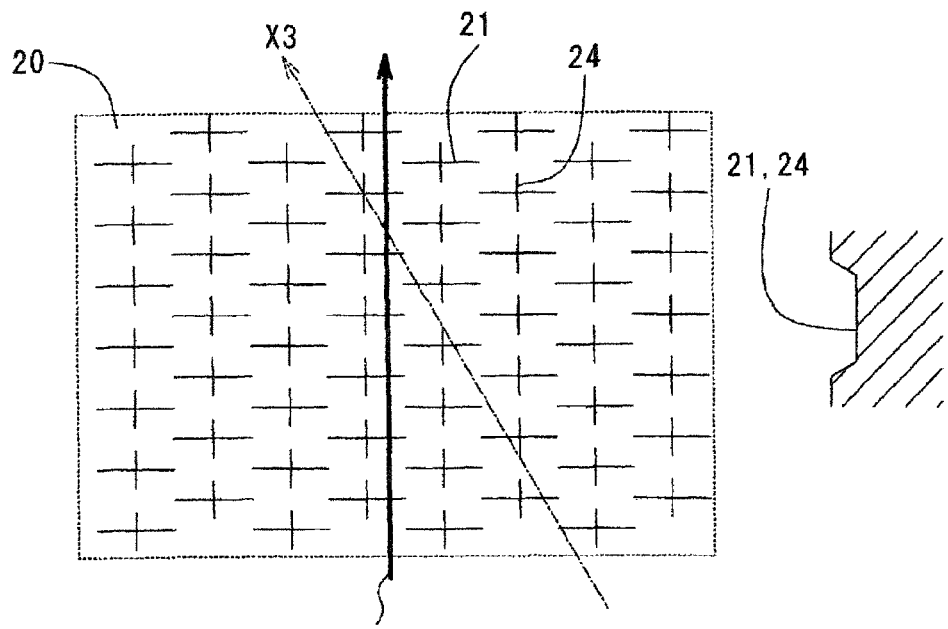
FIG. 6 is a schematic plan view showing an essential part of a second die surface of an injection molding die according to Example 3 of the present invention.

FIG. 6 is a schematic plan view showing a second die surface 20 of a resin injection molding die according to this Example. The die of this Example is similar to that of Example 1 except that the form of steps is different. Specifically, the shape of each of stepped parts 21 is a groove shape having a trapezoidal cross section which is identical with that in Example 1, and a 2.5 mm-long vertical groove 24 extending in parallel to the main flowing direction of the molten resin is formed in the center part in the longitudinal direction of the stepped parts 21 aligned in a staggered manner as with Example 1. The opening width and depth of the vertical groove 24 are identical with those of the stepped parts 21.

According to the resin injection molding die of this Example, the vertical groove 24 also functions as a stepped part, and thus the flow of the molten resin changes even when the direction in which the molten resin flows is different from the main flowing direction (for example, X3 direction shown in FIG. 6), and the influence thereof extend to the vicinity of the design surface.

Example 4

Figure 7:
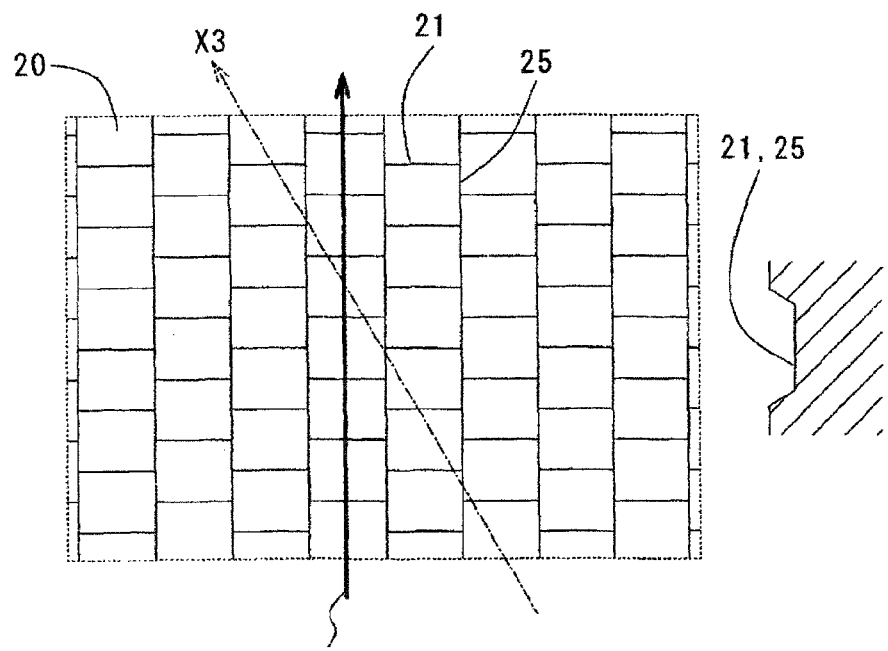
FIG. 7 is a schematic plan view showing an essential part of a second die surface of an injection molding die according to Example 4 of the present invention.

FIG. 7 is a schematic plan view showing a second die surface 20 of a resin injection molding die according to this Example. The die of this Example is similar to that of Example 1 except that the form of steps is different. Specifically, the shape of each of stepped parts 21 is a groove shape having a trapezoidal cross section which is identical with that in Example 1, and also is an "amidakuji" shape such that the end parts of the plurality of stepped parts 21 aligned in a staggered manner as with Example 1 are connected to each other by a linear vertical groove 25 extending in parallel to the main flowing direction of the molten resin. The opening width and depth of the vertical groove 25 are identical with those of the stepped parts 21.

According to the resin injection molding die of this Example, the vertical groove 25 also functions as a stepped part, and thus the flow of the molten resin changes even when the direction in which the molten resin flows is different from the main flowing direction (for example, X3 direction shown in FIG. 7), and the influence thereof extend to the vicinity of the design surface.

Example 5

Figure 8:
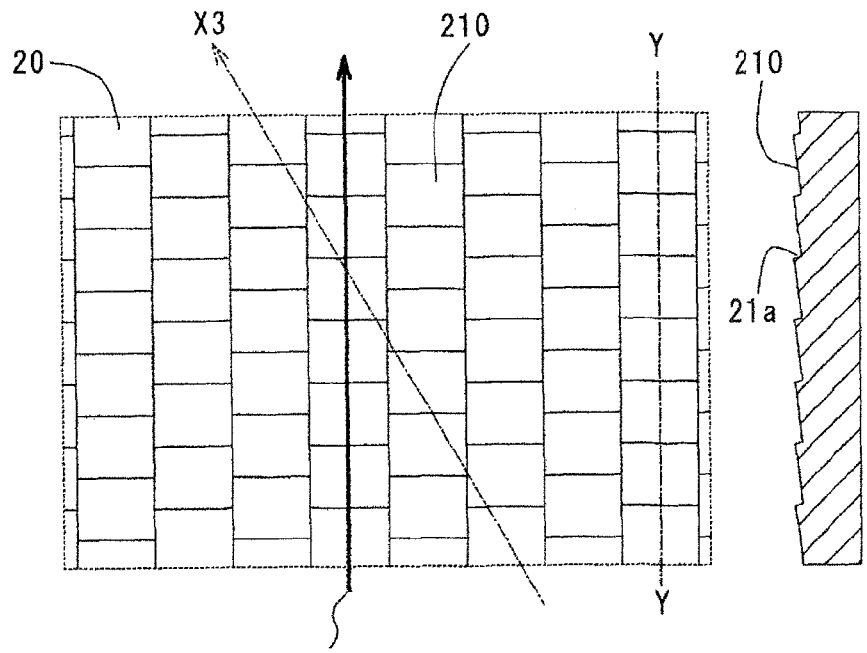
FIG. 8 is a schematic plan view showing an essential part of a second die surface of an injection molding die according to Example 5 of the present invention and a X-X cross sectional view thereof.

FIG. 8 is a schematic plan view showing a second die surface 20 of a resin injection molding die according to this Example. In the meantime, FIG. 8 also includes a Y-Y cross sectional view on the right side. The die of this Example is similar to that of Example 1 except that the form of steps is different. Specifically, each of stepped parts 21 is formed as a tapered groove 210 such that the depth gradually decreases toward the front side with respect to the main flowing direction of the molten resin. The tapered groove 210 continues to the next step surface 21a, engraved one step deeper in the next step surface 21a, and then becomes gradually shallower toward the front side with respect to the flowing direction, and continues to the common die surface part 22. In this case, the common die surface part 22 is an edge-shaped surface. The dimensions of the tapered groove 210 are 0.2 mm for the depth of the deepest part and 4 mm for the pitches between the tapered grooves 210.

Also, the stepped parts 21 are aligned in a staggered manner as with Example 1, and exhibit an appearance like a tiled roof of a house.

The resin injection molding die of this Example provides similar action/effect to those of Example 4. Also, when the second die surface 20 of this Example is applied to a die surface extending in the demolding direction of the resin molded body or a slide core, the demolding of the slide core can be made possible by the tapered groove 210. Further, the side surface of each of the stepped parts 21 also functions as a stepped part, and thus the flow of the molten resin changes even when the direction in which the molten resin flows is different from the main flowing direction (for example, X3 direction shown in FIG. 8), and the influence thereof extends to the vicinity of the design surface.

In the meantime, in the resin injection molding die of this Example, even when the main flowing direction of the molten resin is 180° opposite, namely, the tapered groove 210 is such that the depth gradually increases toward the front side with respect to the main flowing direction of the molten resin, the flow of the molten resin changes, and the influence thereof extends to the vicinity of the design surface.

Comparative Example 1

Figure 9:
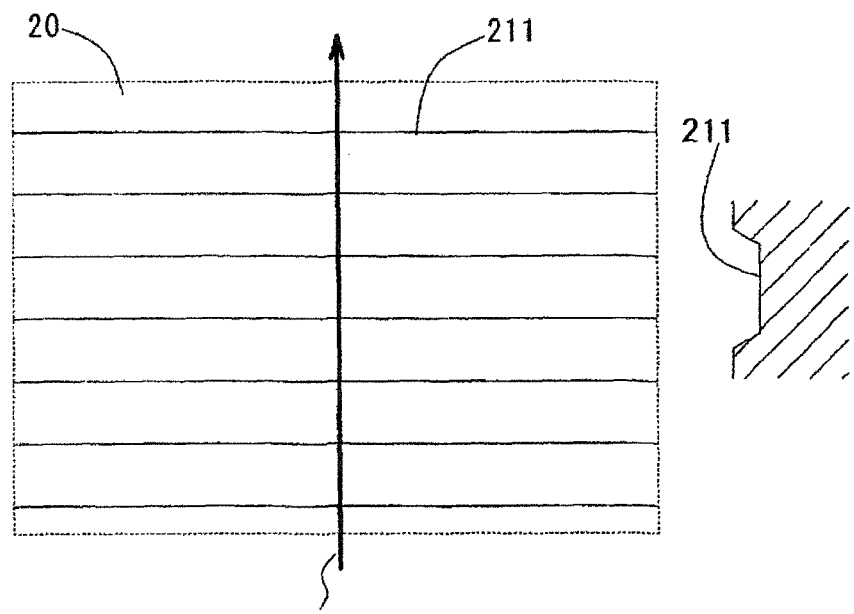
FIG. 9 is a schematic plan view showing an essential part of a second die surface of an injection molding die according to Comparative Example 1 of the present invention.

FIG. 9 is a schematic plan view showing a second die surface 20 of a resin injection molding die according to Comparative Example 1. The die of this Comparative Example is similar to that of Example 1 except that the form of steps is different. The stepped parts are continuous linear groove parts 211 crossing the main flowing direction of the molten resin at 90°, and the plurality of groove parts 211 are aligned in parallel spaced apart from each other. The dimensions of the groove parts 211 are 0.5 mm for the opening width and 0.3 mm for the depth, and the pitches between the groove parts 211 are 4 mm. The cross sectional shape of the groove parts 211 is trapezoidal as shown in FIG. 9.

Comparative Example 2

Figure 10:
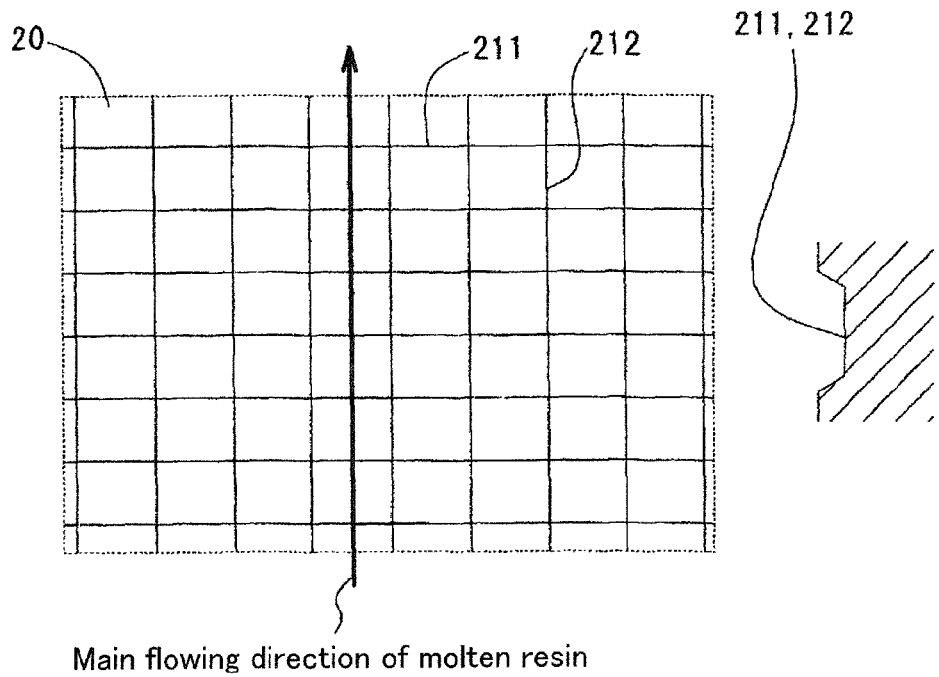
FIG. 10 is a schematic plan view showing an essential part of a second die surface of an injection molding die according to Comparative Example 2 of the present invention.

FIG. 10 is a schematic plan view showing a second die surface 20 of a resin injection molding die according to Comparative Example 2. The die of this Comparative Example is similar to that of Example 1 except that the form of steps is different. The stepped parts have continuous linear groove parts 211 similar to those of Comparative Example 1 and groove parts 212 crossing the groove parts 211 at a right angle, and the plurality of groove parts 211 and groove parts 212 are aligned in parallel spaced apart from each other. The dimensions of both of the groove parts 211 and groove parts 212 are 0.5 mm for the opening width and 0.3 mm for the depth, and the pitches between the groove parts 211 and between the groove parts 212 are 4 mm. The cross sectional shape of the groove parts 211 and groove parts 212 is trapezoidal as shown in FIG. 10.

Comparative Example 3

Figure 11:
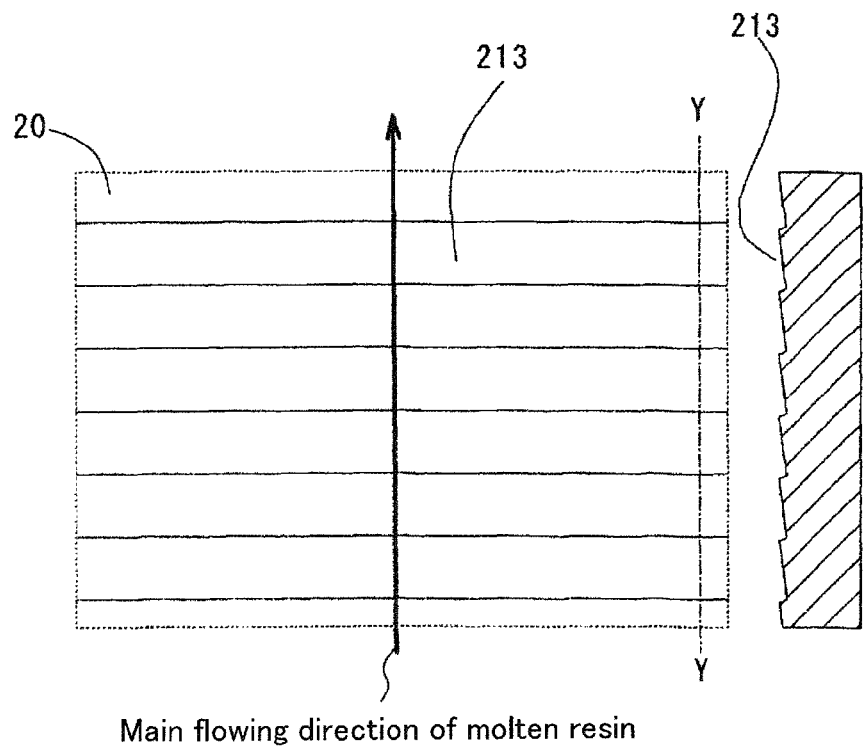
FIG. 11 is a schematic plan view showing an essential part of a second die surface of an injection molding die according to Comparative Example 3 of the present invention and a Y-Y cross sectional view thereof.

FIG. 11 is a schematic plan view showing a second die surface 20 of a resin injection molding die according to Comparative Example 3. In the meantime, FIG. 11 includes a Y-Y cross sectional view on the right side. The die of this Comparative Example is similar to that of Example 5 except that the form of steps is different. The tapered grooves 213 whose depth gradually decreases toward the front side with respect to the main flowing direction of the molten resin cross the main flowing direction of the molten resin at 90° and are formed in a continuous linear manner, and the plurality of tapered grooves 213 are aligned in parallel spaced apart from each other. The cross sectional shape of the tapered grooves 213 is similar to that of the tapered grooves 210 in Example 5, and the pitches between the tapered grooves 213 are 4 mm Comparative Example 4

Figure 12:
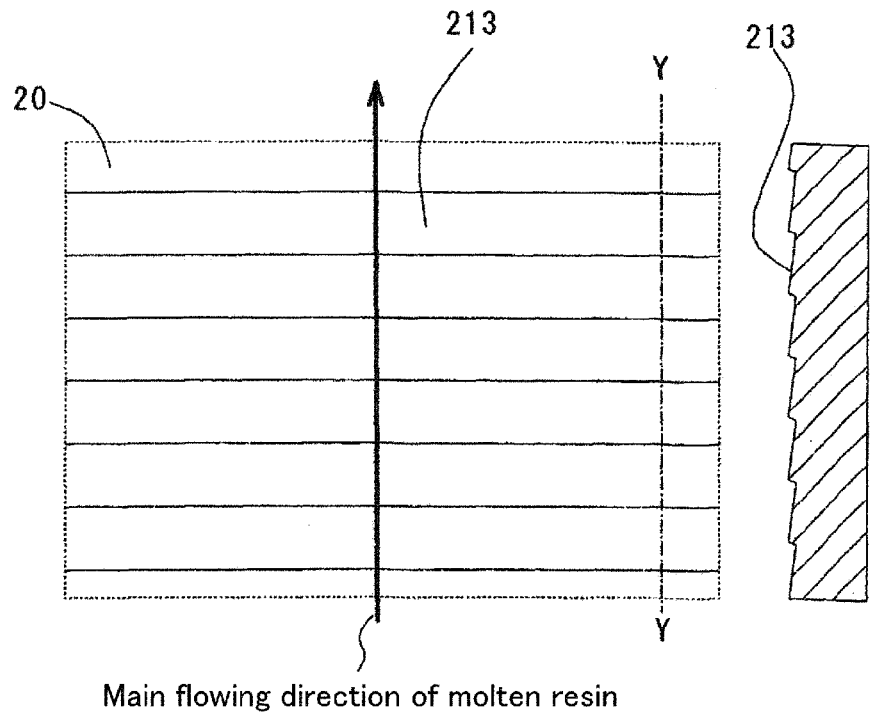
FIG. 12 is a schematic plan view showing an essential part of a second die surface of an injection molding die according to Comparative Example 4 of the present invention and a Y-Y cross sectional view thereof.

FIG. 12 is a schematic plan view showing a second die surface 20 of a resin injection molding die according to Comparative Example 4. In the meantime, FIG. 12 includes a Y-Y cross sectional view on the right side. The die of this Comparative Example is such that the resin injection molding die of Comparative Example 3 is 180° rotated, and the tapered grooves 213 are arranged such that the depth gradually increases toward the front side with respect to the main flowing direction of the molten resin cross the main flowing direction of the molten resin.

Comparative Example 5

Figure 13:
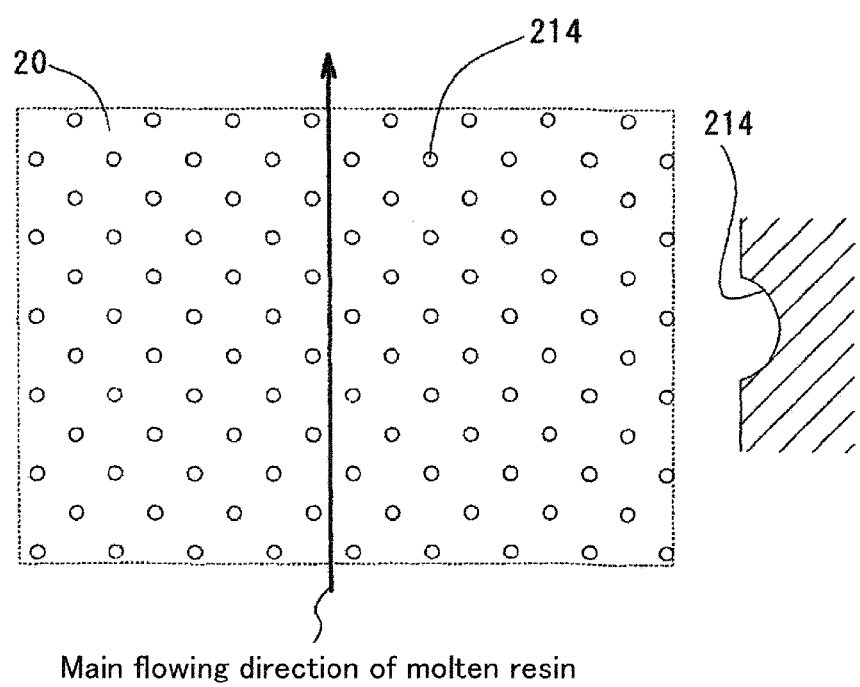
FIG. 13 is a schematic plan view showing an essential part of a second die surface of an injection molding die according to Comparative Example 5 of the present invention.

FIG. 13 is a schematic plan view showing a second die surface 20 of a resin injection molding die according to Comparative Example 5. The die of this comparative Example is similar to that of Example 1 except that the form of steps is different. A plurality of notch-like concave parts 214 are formed in the second die surface 20, and respectively constitute stepped parts. The concave parts 214 are opened in the form of true circles having a diameter of 1 mm in plan view and are formed into semicircles having a depth of 0.4 mm in cross section, and the pitches between the adjacent concave parts 214 are 2.5 mm.

Test Example

The dies of Examples 1 to 5 and Comparative Examples 1 to 5 were used to mold resin molded bodies from an ABS resin. The molding conditions were: molten resin speed of 30 cm/sec. and molten resin temperature of 230° C. Molding was conducted at the two levels of molten resin flowing directions, i.e., in the main flowing direction (90° direction) shown in the respective figures and a flowing direction 30° inclined with respect to the main flowing direction (60° direction).

The resultant resin molded bodies were subjected to cleaning treatment, and then immersed in a moderately warmed solution mixture of chromic acid and sulfuric acid to apply etching treatment to a design surface. Thereafter, a Pd catalyst was adhered to the design surface, and a nickel plating layer was formed by an electroless plating method. Further, a metallic chromium plating layer was formed on the surface of the nickel plating layer by an electroplating method.

The resin molded products with the resultant metal plating were left at 25° C. for 48 hours, and then the peeling strength of the plating film was measured using a membrane physical property measuring device ("Autograph AGS-500ND" manufactured by Shimadzu Corporation) under the following conditions: tensile speed of 25 mm/min and 20° C. The average peeling strength (A) of the plating film at a site corresponding to the common die surface part 22 in which no stepped part was formed and the average peeling strength (B) of the plating film at a site corresponding to the stepped part were obtained to calculate a 100(B−A)/A value as the adhesion improvement rate. The results are indicated in Table 1.

Figure 14:
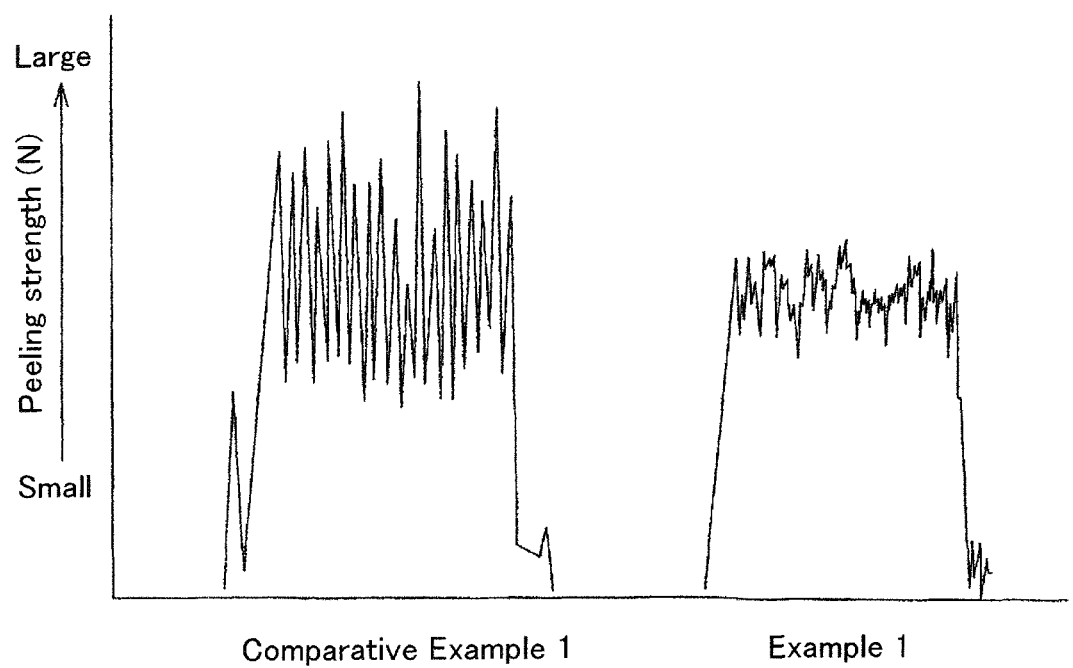
FIG. 14 is a graph showing the peeling strength of the plating films of the plated resin molded products produced in Comparative Example 1 and Example 1.

According to the above-described measurement data, as shown in FIG. 14, a variation in amplitude of the peeling strength in the stepped part was observed in the respective products tested. Then, the difference (C) between the maximum and minimum values of the amplitude in the data on the 90° direction was obtained to evaluate a C/A value as the adhesion stability. The results are indicated in Table 1.

TABLE 1

|  | Corresponding figure | Adhesion improvement rate (%) 90° | Adhesion improvement rate (%) 60° | Adhesion stability (C/A value) |
| --- | --- | --- | --- | --- |
| Example 1 | 4 | 48 | 16 | 0.3 |
| Example 2 | 5 | 47 | 24 | 0.3 |
| Example 3 | 6 | 45 | 36 | 0.4 |
| Example 4 | 7 | 48 | 27 | 0.3 |
| Example 5 | 8 | 52 | 38 | 0.4 |
| Comparative Example 1 | 9 | 50 | 12 | 0.8 |
| Comparative Example 2 | 10 | 42 | 29 | 0.7 |
| Comparative Example 3 | 11 | 48 | 15 | 0.6 |
| Comparative Example 4 | 12 | 58 | 16 | 0.8 |
| Comparative Example 5 | 13 | 3 | 3 | 0.2 |

From Table 1, it can be seen that all of the molded products have a plus adhesion improvement rate and that the adhesion strength at a site corresponding to the stepped part is higher than that at a site corresponding to the common die surface part 22. This is an effect obtained by formation of a stepped part on the second die surface. However, the adhesion improvement rate is quite small in Comparative Example 5. The differences in adhesion improvement rate between in the 90° direction and in the 60° direction in Examples 1 to 5 are smaller than those in Comparative Examples 1, 3 and 4. In view of this fact, it can be understood that the adhesion improves even when the flowing direction of the molten resin changes. It can also be seen that, among others, Examples 2 to 5 exhibit small differences, and that Example 5 is especially excellent. Also, it is apparent that Examples 1 to 5 have a small variation in adhesion and excellent stability as compared with Comparative Examples 1 to 4.

In view of the fact that the adhesion improvement rate in Comparative Example 3 was smaller than that of Comparative Example 4, it is inferred that the tapered grooves 210 whose depth gradually decreases toward the front side with respect to the main flowing direction of the molten resin as in Example 5 have grater effects than those of tapered grooves whose depth gradually increases toward the rear side with respect to the main flowing direction of the molten resin.

EXPLANATION OF REFERENCE NUMERALS

1. Fixed die
2. Movable die
10. First die surface
20. Second die surface
21. Stepped part
22. Common die surface part
21*a*. Step surface

What is claimed is:

1. A resin injection molding die forming a molded resin body, said molding die comprising:
a first die surface, a second die surface facing the first die surface, and a molding cavity provided between the first and second die surfaces, wherein
the first die surface is arranged on one side of the molding cavity to mold a design surface side of the resin molded body to which metal plating is to be applied,
the second die surface is arranged on another side of the molding cavity to mold a back surface side of the resin molded body opposite to the design surface side,
the molding cavity has a main flowing direction of a molten resin to be molded,
the second die surface includes a common die surface and plurality of stepped parts crossing the main flowing direction of the molten resin and configured to suppresses formation of a fragile layer on the design surface side of the resin molded body,
the plurality of stepped parts are spaced apart from each other in the main flowing direction of the molten resin, and
each stepped part includes a stepped surface extending either upwardly or downwardly from the common die surface part and another surface extending from an end of the stepped surface back to the common die surface part.

2. The resin injection molding die according to claim 1, wherein the stepped parts are in the form of strips which are long in the direction orthogonal to the main flowing direction of the molten resin and short in the direction parallel to the main flowing direction of the molten resin, in plan view.

3. The resin injection molding die according to claim 1, wherein the intervals between the stepped parts in the direction orthogonal to the main flowing direction of the molten resin range from 3 mm to 20 mm.

4. The resin injection molding die according to claim 1, wherein the intervals between the step surfaces in the direction parallel to the main flowing direction of the molten resin range from 2 mm to 20 mm.

5. The resin injection molding die according to claim 1, wherein the stepped parts are arranged in a staggered manner in the direction parallel to the main flowing direction of the molten resin, and the intervals between the step surfaces in the direction parallel to the main flowing direction of the molten resin range from 2 mm to 20 mm.

6. The resin injection molding die according to claim 1, wherein the stepped parts have a step from the common die surface part (height of the step surfaces) ranging from 0.1 mm to 0.3 mm.

7. The resin injection molding die according to claim 1, wherein the second die surface is a die surface extending in a demolding direction of the resin molded body, and the stepped parts are tapered step parts which are positioned one step lower than the common die surface part with the step surface, then gradually become shallower toward the side opposite to the demolding direction, and continue to the common die surface parts.

8. The resin injection molding die according to claim 1, wherein the common die surface parts and the step surfaces cross each other in an edge shape in the cross section cut in a plane parallel to the main flowing direction of the molten resin.

9. A method for producing a resin molded product, comprising injection molding a thermoplastic resin by means of the resin injection molding die according to claim 1 to form a resin molded body and forming a metal plating layer on a design surface of the resin molded body.

10. The method for producing a resin molded product according to claim 9, wherein the thermoplastic resin comprises butadiene rubber particles.

11. A resin injection molding die forming a molded resin body having improved adhesion to a metal plating, comprising:
- a first die surface, a second die surface facing the first die surface, and a molding cavity provided between the first and second die surfaces, wherein
- the first die surface is arranged on one side of the molding cavity to mold a design surface side of the resin molded body to which metal plating is to be applied,
- the second die surface is arranged on another side of the molding cavity to mold a back surface side of the resin molded body opposite to the design surface side,
- the molding cavity has a main flowing direction of a molten resin to be molded,
- the second die surface includes a common die surface and plurality of stepped parts crossing the main flowing direction of the molten resin, the step parts having a shape and arrangement effective for changing flow direction of the molten resin within the molding cavity and suppressing formation of a fragile layer on the design surface side of the resin molded body, and
- the shape and arrangement of the stepped parts including the plurality of stepped parts are spaced apart from each other in the main flowing direction of the molten resin, and each stepped part includes at least one of a stepped surface extending either upwardly or downwardly from the common die surface part and another surface extending from an end of the stepped surface back to the common die surface part, a depth, a width, and a pitch along the main flowing direction of the molten resin.

* * * * *